US011159789B2

(12) United States Patent
Kwong et al.

(10) Patent No.: US 11,159,789 B2
(45) Date of Patent: Oct. 26, 2021

(54) GENERATIVE ADVERSARIAL NETWORK BASED INTRA PREDICTION FOR VIDEO CODING

(71) Applicant: City University of Hong Kong, Kowloon (HK)

(72) Inventors: Tak Wu Sam Kwong, Kowloon (HK); Linwei Zhu, Kowloon (HK); Yun Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/169,729

(22) Filed: Oct. 24, 2018

(65) Prior Publication Data

US 2020/0137384 A1    Apr. 30, 2020

(51) Int. Cl.
*H04N 19/11* (2014.01)
*H04N 19/70* (2014.01)
*G06N 3/08* (2006.01)
*G06N 3/04* (2006.01)

(52) U.S. Cl.
CPC .......... *H04N 19/11* (2014.11); *G06N 3/0454* (2013.01); *G06N 3/088* (2013.01); *H04N 19/70* (2014.11)

(58) Field of Classification Search
CPC ........ H04N 19/11; H04N 19/70; G06N 3/088; G06N 3/0454
See application file for complete search history.

(56) References Cited

U.S. PATENT DOCUMENTS

| | | | |
|---|---|---|---|
| 9,838,689 B2 | 12/2017 | Lee et al. |
| 9,838,696 B2 | 12/2017 | Kim et al. |
| 9,848,206 B2 | 12/2017 | Lim et al. |
| 9,860,557 B2 | 1/2018 | Jeon et al. |
| 9,883,191 B2 | 1/2018 | Lee et al. |
| 9,900,618 B2 | 2/2018 | Lee et al. |
| 9,930,362 B2 | 3/2018 | Gao et al. |

(Continued)

OTHER PUBLICATIONS

Sullivan, G. et al. "Overview of the High Efficiency Video Coding (HEVC) Standard," IEEE Trans. Circuits Syst. Video Technol., vol. 22, No. 12, pp. 1649-1668, Dec. 2012, 20 pages.

(Continued)

*Primary Examiner* — Tracy Y. Li
(74) *Attorney, Agent, or Firm* — Norton Rose Fulbright US LLP

(57) ABSTRACT

Systems and methods which provide Generative Adversarial Network (GAN) based intra prediction for video coding are described. GAN based intra prediction as implemented according to embodiments may be modeled as an inpainting task. For example, intra prediction may be formulated as a learning based inpainting task, wherein a latent variable is designed to control different generation modes. GAN based intra prediction provided according to embodiments of the invention may be implemented alone or in combination with one or more other video compression technique, such as a direction intra prediction technique. The intra prediction module of such a HEVC encoder/decoder may be redesigned to also apply GAN based inpainting in intra prediction, wherein Rate-Distortion Optimization (RDO) may be performed to select the best intra prediction mode between the intra prediction approaches.

25 Claims, 8 Drawing Sheets

(56) References Cited

U.S. PATENT DOCUMENTS

| | | | |
|---|---|---|---|
| 9,948,930 | B2 | 4/2018 | Panusopone et al. |
| 9,998,759 | B2 | 6/2018 | Jeon et al. |
| 10,003,796 | B2 | 6/2018 | Siddaramanna et al. |
| 10,003,818 | B2 | 6/2018 | Xu et al. |
| 10,015,489 | B2 | 7/2018 | Oh et al. |
| 10,015,515 | B2 | 7/2018 | Guo et al. |
| 2003/0139828 | A1* | 7/2003 | Ferguson ............ G05B 13/048 700/53 |
| 2006/0146940 | A1* | 7/2006 | Gomila ................ H04N 19/11 375/240.27 |
| 2009/0238276 | A1* | 9/2009 | Har-Noy ............. H04N 19/117 375/240.13 |
| 2018/0184123 | A1* | 6/2018 | Terada ................ H04N 19/109 |
| 2019/0385346 | A1* | 12/2019 | Fisher ................. G06F 40/109 |
| 2020/0021865 | A1* | 1/2020 | Topiwala ............ H04N 19/176 |
| 2020/0092552 | A1* | 3/2020 | Coelho ............... H04N 19/119 |

OTHER PUBLICATIONS

Iizuka, S. et al. "Globally and Locally Consistent Image Completion," ACM Trans. on Graph., vol. 36, No. 4, pp. 107:1-107:14, Jul. 2017, 14 pages.

Schaefer, G. et al. "UCID: An Uncompressed Colour Image Database," Proceedings of SPIE: Storage and Retrieval Methods and Applications for Multimedia, vol. 5307, 2004, 9 pages.

Li, J. et al. "Efficient Multiple Line-Based Intra Prediction for HEVC," IEEE Trans. Circuits Syst. Video Technol., vol. 28, No. 4, pp. 947-957, Apr. 2018, 11 pages.

Li, J. et al. "Fully Connected Network-Based Intra Prediction for Image Coding," IEEE Trans. Image Process., vol. 27, No. 7, pp. 3236-3247, Jul. 2018, 12 pages.

Chen, H. et al. "Improving Intra Prediction in High-Efficiency Video Coding," IEEE Trans. Image Process., vol. 25, No. 8, pp. 3671-3682, Aug. 2016, 12 pages.

Zhang, T. et al. "Hybrid Intraprediction Based on Local and Nonlocal Correlations," IEEE Trans. Multimedia, vol. 20, No. 7, Jul. 2018, 14 pages.

Chen, C. et al. "A New Block-Based Method for HEVC Intra Coding," IEEE Trans. Circuits Syst. Video Technol., vol. 27, No. 8, pp. 1727-1736, Aug. 2017, 10 pages.

Qi, X. et al. "Intra Prediction with Enhanced Inpainting Method and Vector Predictor for HEVC," 2012 IEEE Acoustics, Speech and Signal Processing (ICASSP), pp. 1217-1220, Kyoto, Japan, Mar. 25-30, 2012, 4 pages.

* cited by examiner

FIG. 7

```
Input: Training samples
Output: D, G networks
T = 0, B = 35, N = 28000, epoch = 5000;
while T < epoch do
        randomly re-order the list of training samples;
        for i = 0; i < N/B; i = i + 1 do
                obtain samples with indices from i to i + B in the list;
                set the pixel value of missing part as P;
                normalize the pixel values of samples from [0, 2^{k-1}] to [-1, +1];
                feed B training samples into GAN;
                if T < 0.5 × epoch then
                        update G with Eq. (2);
                else
                update D using Eq. (3) with fixed G;
                        update G using Eq. (3) with fixed D;
        T = T + 1;
return D, G;
```

FIG. 8

GENERATIVE ADVERSARIAL NETWORK BASED INTRA PREDICTION FOR VIDEO CODING

TECHNICAL FIELD

The invention relates generally to video coding and, more particularly, to Generative Adversarial Network (GAN) based intra prediction for video coding.

BACKGROUND OF THE INVENTION

Various video compression techniques have been utilized with respect to digital video for reducing and removing redundant video data. A significant reduction in digital video file size can be realized with little or no adverse effect on the visual quality through implementation of an efficient video compression technique. Accordingly, video compression may be implemented to facilitate transmission of a digital video file over a network, for efficiently storing a digital video file in computer readable memory, and/or the like.

In operation to provide video compression, source digital video (e.g., a sequence of digital video frames) is encoded by a video encoder to create a compressed video bit stream, wherein a resulting compressed bit stream may be stored, transmitted, etc. For example, the video encoder may perform the following steps: Partitioning each image into multiple units; Predicting each unit using inter or intra prediction, and subtracting the prediction from the unit Transforming and quantizing the residual (the difference between the original image unit and the prediction unit); and Entropy encoding transform output, prediction information, mode information and headers. A corresponding video decoder may decompress the bit stream to create a sequence of decoded video frames, such as for playback of the digital video. Accordingly, the video decoder may perform the following steps: Entropy decoding and extracting the elements of the coded sequence; Resealing and inverting the transform stage; Predicting each unit and adding the prediction to the output of the inverse transform; and Reconstructing a decoded video image.

As mentioned above, video compression techniques are utilized with respect to digital video to reduce and remove redundant video data. Redundancy in the spatial domain often manifests as pixels (samples) that are close to each other in the same frame or field usually being highly correlated. That is, spatial redundancy or intra-frame correlation is associated with the appearance of samples in an image that are often similar to their adjacent neighbor samples. This redundant information in the spatial domain can be exploited to compress the image using video compression techniques.

Redundant information in the spatial domain can be exploited to compress the image using intra prediction video compression techniques implementing intra prediction with respect to the spatial domain, wherein an image or frame is compressed without referring to other images or frames in the video sequence. Such intra prediction video compression is designed to minimize the duplication of data in each image or frame spatial-domain redundancy). In operation, intra prediction video compression comprises forming a prediction block and subtracting the prediction block from the current coding block, wherein more accurate predictions result in smaller residual and better coding performance.

High Efficiency Video Coding (HEVC), for example, implements intra prediction intra-image or intra-frame prediction) for reducing and removing redundant video data. For example, intra coding in HEVC utilizes intra prediction, transform coding, quantization, post-processing, and entropy encoding modules. It should be appreciated that HEVC differs from the block-oriented motion-compensation-based video compression of H.264/Advanced Video Coding (AVC) in various features developed for coding performance improvement, such as quad-tree based variable Coding Unit (CU) structure, adaptive smoothing of reference pixels, and prediction direction based transform coefficient scanning.

Intra prediction as implemented in HEVC uses previously decoded boundary samples from spatially neighboring transform blocks (TBs) to predict a new prediction block (PB). The values of the PBs are constructed by combining their adjacent neighbor samples (reference samples) utilizing a plurality of different intra prediction modes, and selecting a PB of the intra prediction mode that provides the best Rate Distortion (RD) performance. That is, in intra prediction implemented by HEVC the samples in the nearest neighboring column and row (e.g. analogous to H.264/AVC video compression operation) are utilized based on spatial extrapolation to predict the current block. HEVC video coding, however, utilizes more directional modes than H.264/AVC. In particular, HEVC intra prediction utilizes 35 different intra prediction modes, including 1 Planar mode (intra prediction mode 0), 1 DC mode (intra prediction mode 1), and 33 angular modes (intra prediction modes 2-34), to predict PBs for a particular frame. In the foregoing directional modes, mode 0 (Planar) is designed to predict the gradually changing content, in which the bilinear interpolation is adopted to predict the pixels, mode 1 (DC) is designed to predict the homogeneous block based on identical prediction pixels equaling to the average value of reference column and row, modes 2-17 can be regarded as horizontal modes, and modes 18-34 can be regarded as vertical modes. In operation, the video encoder chooses the intra prediction mode that provides the best RD performance (e.g., an optimal mode is selected based on the RD cost comparison among the 35 intra prediction modes).

In performing video compression operation, HEVC images (e.g., frames) are divided into Coding Tree Units (CTUs) each providing a coding logical unit which is encoded into an HEVC bit-stream, wherein the CTUs in a video sequence can be 64×64, 32×32, or 16×16, depending on the video stream parameters. HEVC CTUs comprise three blocks, including luma (Y) that covers a square image area of L×L samples of the luma component, and two chroma components ($C_b$ and $C_r$) that cover L/2 ×L/2 samples of each of the two chroma components, and associated syntax elements. Each block is called Coding Tree Block (CTB) which can be split recursively in a quad-tree structure, from the same size as CTB to as small as 8×8. Each block resulting from this partitioning of a CTB is called a Coding Block (CB). The aforementioned syntax elements may include parameters describing properties of different types of units of a coded block of pixels and how the video sequence can be reconstructed at the decoder (e.g., providing the method of prediction, such as inter or intra prediction, intra prediction mode, and motion vectors) and other parameters.

After the optimal intra prediction mode is selected, the index of intra prediction mode should be coded and transmitted to the decoder, such as using the aforementioned syntax elements. In HEVC, three Most Probable Modes (MPMs) are defined for each Prediction Unit (ICU) according to the neighboring PUs. For an intra prediction mode, if it belongs to one of the three MPMs, only the index of this MPM will be transmitted to the decoder. Otherwise, a 5-bit fixed length code ($2^5=35-3$) will be utilized to represent the index of intra prediction mode.

The foregoing prediction type along with other parameters may be coded in a Coding Unit (CU) comprising three CBs (V, $C_b$ and $C_r$), and associated syntax elements. The CU is, for example, the basic unit of prediction in HEVC. CBs may be split into Prediction Blocks (PBs) to facilitate storing motion vectors (e.g., inter-image (temporal) prediction or intra-image (spatial) prediction mode). For example, each CB can be split into PBs differently depending on the temporal and/or spatial predictability.

For the residual (the difference between the original and the prediction) coding, the techniques of intra prediction mode dependent transforms and coefficient scanning are adopted for performance improvement in HEVC. In particular. Discrete Sine Transform (DST) is applied to 4×4 luma blocks and Discrete Cosine Transform (DCT) based transform is applied to the others. In order to further reduce the statistical redundancy, adaptive scanning of transform coefficients is performed, where scan order will be determined by looking up table according to different intra prediction modes and different block sizes.

The next generation video coding standard, Versatile Video Coding (VVC), has been defined at the $10^{th}$ meeting of Joint Video Experts Team (JVET) on April 2018 and is excepted to be issued by the end of 2020, which aims to exploit more sophisticated coding algorithms to further improve the coding performance. One of the important techniques is coding structure of Quad Tree plus Binary Tree and Ternary Tree (QTBTTT), which is developed to provide recursive binary tree and ternary tree partitions besides quad-tree block partition to adapt the diverse video contents and achieves great performance improvement. For the intra coding, it extends the directional intra modes from 33 defined in HEVC to 65, where the Planar and DC modes are kept. As a result, there are 67 intra modes in total. These denser directional intra modes will be employed to both luma and chroma intra predictions. To accommodate these increased 33 directional intra modes, an intra mode coding method with 6 MPMs is used, which includes the derivation of 6 MPMs, and entropy coding of 6 MPMs. In addition, multi-model Cross-Component Linear Model (CCLM) and multi-filter CCLM were adopted into the Joint Exploration Model (JEM) by NET for chroma intra prediction with the assumption that there is a linear correlation between the luma and the chroma components in a coding block. However, most of these proposals are still under discussion whether they will be accepted by VVC or not.

It should be appreciated from the foregoing that current and next generation intra prediction algorithms (e.g., intra prediction as implemented in H.264/AVC, HEVC, and VVC) do not provide robust prediction which fully exploits available information or enables generation of flexible prediction patterns. For example, such intra prediction algorithms only use limited information for intra prediction and fixed prediction pattern (e.g., the pixels in the nearest neighboring row and column, or within multiple lines).

BRIEF SUMMARY OF THE INVENTION

The present invention is directed to systems and methods which provide Generative Adversarial Network (GAN) based intra prediction for video coding. GAN based intra prediction of embodiments is configured to address the limitations, such as limited reference information and fixed prediction patterns, of the intra prediction methods implemented by current and next generation video coding techniques.

The GAN of embodiments is, for example, configured to intelligently remove the spatial redundancy with the inference process. The generator network from GAN may be applied to infer the missing part of an image (e.g., frame of a digital video) based on the already decoded blocks. In operation according to embodiments, a plurality of intra prediction modes (e.g., 35 intra prediction modes) are designed for GAN based intra prediction, where a latent variable is used to control different generation modes. Accordingly, GAN based intra prediction implemented according to embodiments of the present invention exploits more available information to provide prediction of the to-be-coded unit than current and next generation intra prediction algorithms and facilitates generation of more flexible prediction patterns to realize improved the intra prediction.

Intra prediction as implemented according to embodiments is modeled as an inpainting task. For example, intra prediction may be formulated as a learning based inpainting task. An inpainting task for intra prediction of embodiments of the invention may be implemented with the GAN model to fill in the missing part of an image (e.g., frame of a digital video) by conditioning on the available reconstructed pixels. Accordingly, embodiments apply GAN based inpainting in intra prediction for video coding. Experimental results show that implementation of GAN based inpainting in intra prediction in video coding realize 6.5%, 7.5%, and 7.6% bit rate reduction on average for lura and chroma components as compared to intra coding as traditionally implemented in HEVC. Intra coding does not only play an important role in video coding, such as the intra refresh for random access, but also can be regarded as an isolated image codec. Therefore, improving the intra coding performance is critical and essential for practical image and video coding applications. Accordingly, GAN based intra prediction for video coding according to embodiments may be utilized to significantly improve the coding performance, which can be used in video transmission and storage with limited resources. Embodiments of the present invention may, for example, be applied to high efficiency video codecs to address the issue of increased multimedia video data, which has challenged the transmission and storage.

GAN based intra prediction provided according to embodiments of the invention may be implemented alone or in combination with one or more other video compression technique. For example, GAN based intra prediction may be implemented in a HEVC encoder and decoder to improve the intra coding performance. The intra prediction module of such a HEVC encoder/decoder may be redesigned to also apply GAN based inpainting in intra prediction, wherein Rate-Distortion Optimization (RDO) may be performed to select the best intra prediction mode between the traditional intra prediction and the GAN based intra prediction approaches to achieve better coding performance. Such embodiments may implement various features (e.g., introducing an additional flag to the syntax elements for signaling the intra prediction method selected) configured to facilitate the multiple intra prediction method implementation.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

Figure 7:
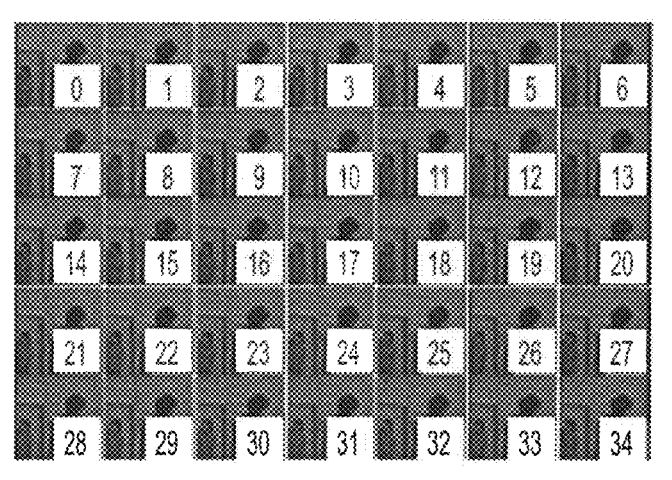

FIG. 7 shows an example of 35 versions of input to the GAN used in training according to embodiments of the present invention; and FIG. 8 shows a training stage algorithm as may be used in training implementing a GAN based inpainting architecture according to embodiments of the present invention.

DETAILED DESCRIPTION OF THE INVENTION

Intra prediction, as currently used in video compression techniques to reduce and remove redundant video data, can be summarized as follows: (1) obtain the reference pixels in the nearest neighboring column and row; (2) filter the obtained reference pixels; (3) predict the current block with reference pixels for each of a plurality (e.g., 35) of candidate intra prediction modes; (4) select the best intra prediction mode from the plurality of candidate intra prediction modes according to the Rate Distortion (RD) cost. A disadvantage of this approach is that the number of reference pixels is limited, as only the pixels in the nearest neighboring column and row are involved. Accordingly, intra prediction based video compression often results in inaccurate prediction as may cause increased residual and poor coding performance.

Figure 1A:
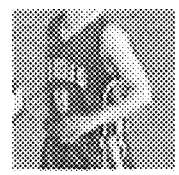
FIG. 1A shows an image block to be predicted, such as for video coding.
Figure 1B:
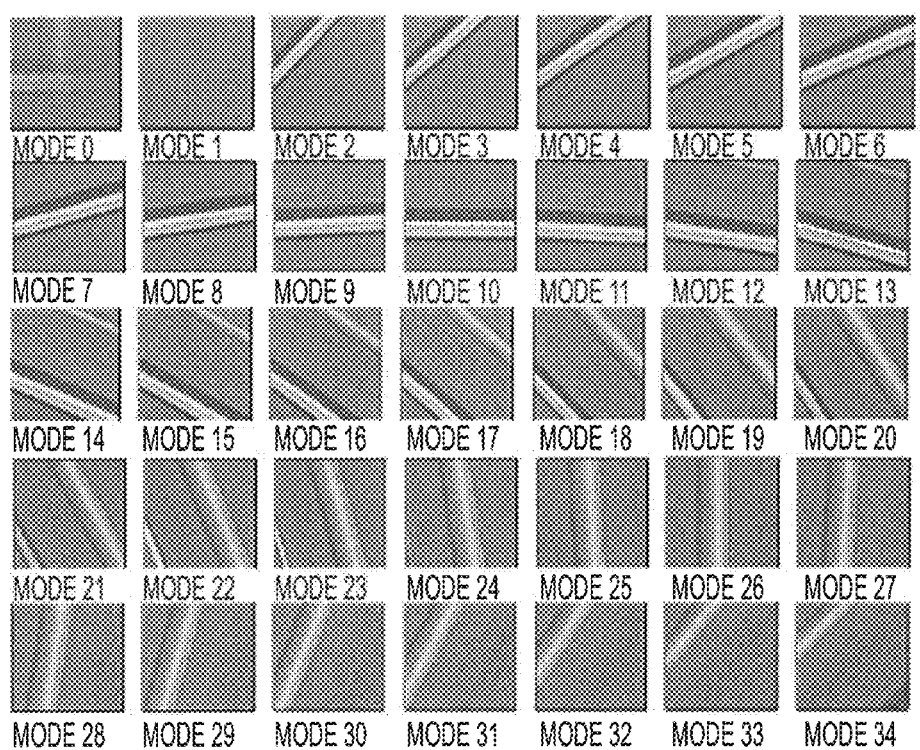
FIG. 1B shows direction based intra prediction results of 35 intra prediction modes with respect to the image block of FIG. 1A.

High Efficiency Video Coding (HEVC) provides a specific example of intra prediction in accordance with the foregoing. The intra prediction results provided by operation of HEVC, as illustrated in FIGS. 1A and 1B, may be extracted for analyzing the intra prediction operation, see e.g., G. Sullivan, J. Ohm, W. Han, and T. Wiegand, "Overview of the high efficiency video coding (HEVC) standard", IEEE Trans. Circuits Syst, Video Technol., vol. 22, no. 12, pp. 1649-1668, December 2012, the disclosure of which is incorporated herein by reference. In the example of FIGS. 1A and 1B, the sequence "BasketballPass" is encoded by HEVC test model under Quantization Parameter (QP) of 22, wherein FIG. 1A shows the block to be predicted, also referred to as the to-be-coded block, and FIG. 1B shows the intra prediction results of 35 intra prediction modes (i.e., Planar mode 0, DC mode 1, and angular modes 2-34). It should be understood that, in the HEVC intra prediction example illustrated in FIGS. 1A and 1B, only the prediction results of the prediction unit (PU) with size of 64×64 are illustrated for the purpose of visualization.

Figure 2:
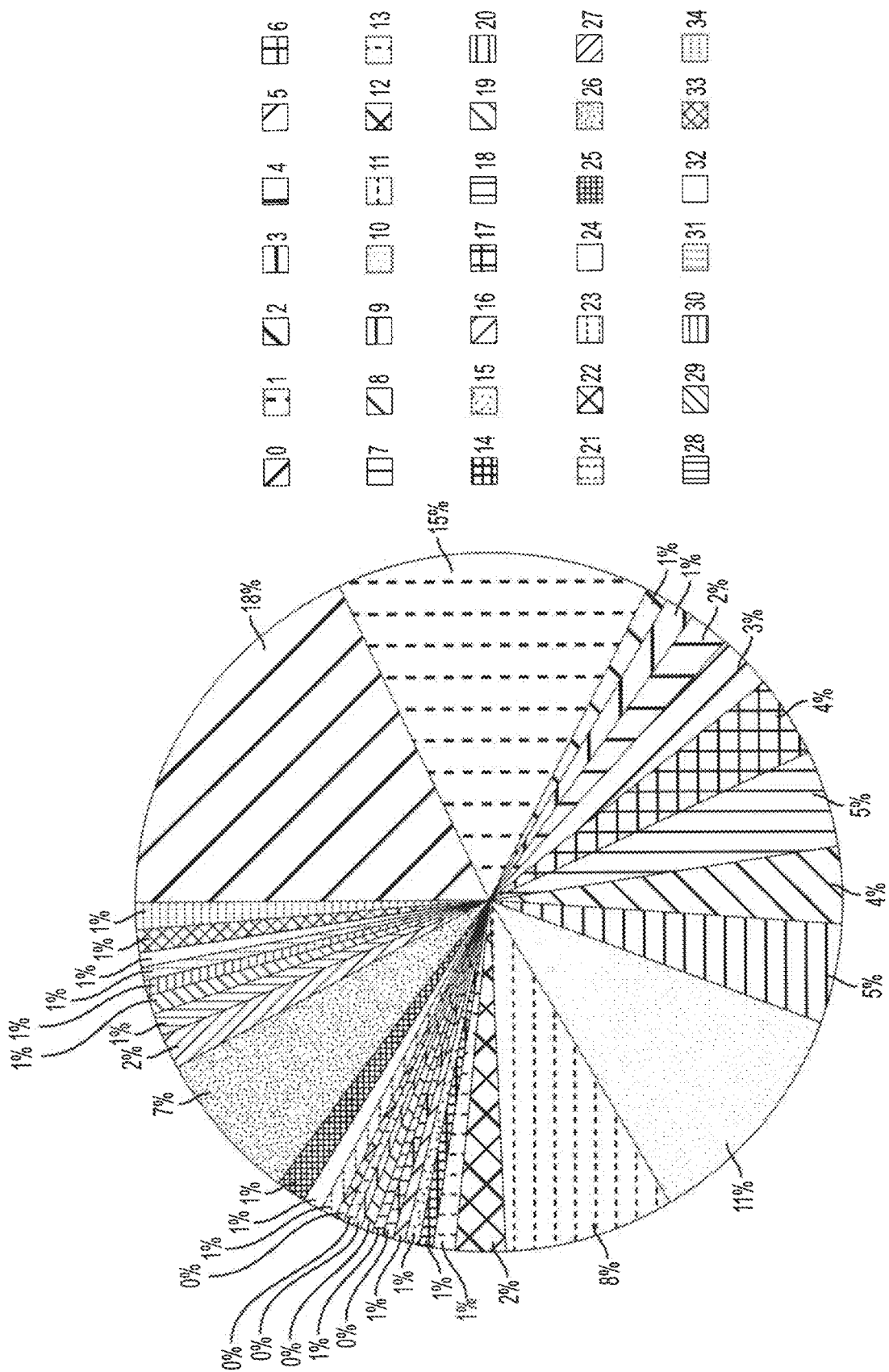
FIG. 2 shows the distribution of the 35 intra prediction modes of the directional intra prediction example of FIG. 1B.

The distribution of the 35 intra prediction modes of the HEVC intra prediction example of FIGS. 1A and 1B is shown in FIG. 2. It can be seen in FIG. 2 that intra prediction modes 0, 1, 10 and 26 are more frequently used than the other intra prediction modes. Comparing the block to be predicted of FIG. 1A with the intra prediction results most frequently used (i.e., intra prediction modes 0, 1, 10, and 26) in FIG. 1B, it can be seen that there is a significant gap between them. Moreover, due to the extrapolation mechanism, these prediction patterns are particularly fixed following the samples used for prediction as well as the direction. This poses challenges in generating a flexible prediction pattern that is highly correlated with the to-be-coded block.

Figure 3:
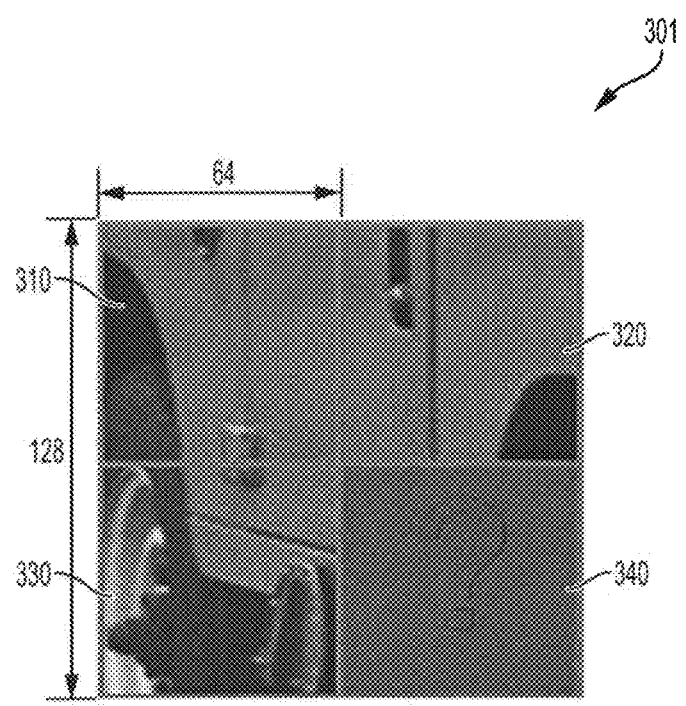
FIG. 3 illustrates the intra prediction problem with respect to an example image block.

FIG. 3 illustrates the intra prediction problem with respect to example image 300. As shown in FIG. 3, given the available blocks from above-left (block 310), above (block 320), and left (block 330), the to-be-coded block in bottom-right (block 340) may be predicted in operation of an intra prediction method.

In accordance with the concepts of the present invention, the intra prediction problem may be modeled as an inpainting task using the neighboring available information. Using an inpainting task in accordance with concepts herein, more information can be exploited compared to the pixels in the nearest neighboring column and row in a HEVC or similar typical intra prediction implementation. Moreover, flexible prediction patterns can be generated based on the generative model in accordance with embodiments of the invention.

Intra prediction may be formulated as a learning based inpainting task in implementing intra prediction modeled as an inpainting task according to embodiments of the invention. Embodiments herein, for example, apply Generative Adversarial Network (GAN) based inpainting in intra prediction for video coding. In operation, an inpainting task for intra prediction of embodiments of the invention may be implemented with the GAN model (i.e., a system of two neural networks contesting with each other in a zero-sum game framework) to fill in the missing part of an image (e.g., frame of a digital video) by conditioning on the available reconstructed pixels.

Although deep learning has shown great promises with respect to the inpainting task, particularly based on the GAN model, it should be appreciated that heretofore challenges remain with respect to directly applying GAN based inpainting in intra prediction. For example, compared with traditional inpainting methods with a missing part at the center, there is a lack of the surrounding information as only blocks from above-left (e.g., block 310 of FIG. 3), above (e.g., block 320 of FIG. 3), and left (e.g., block 330 of FIG. 3) are available, leading to difficulties in recovering the structural information without abundant information. Accordingly, an advanced GAN based inpainting model configured for use in the task of intra prediction is utilized according to embodiments of the invention, as discussed in further detail below.

Figure 4:
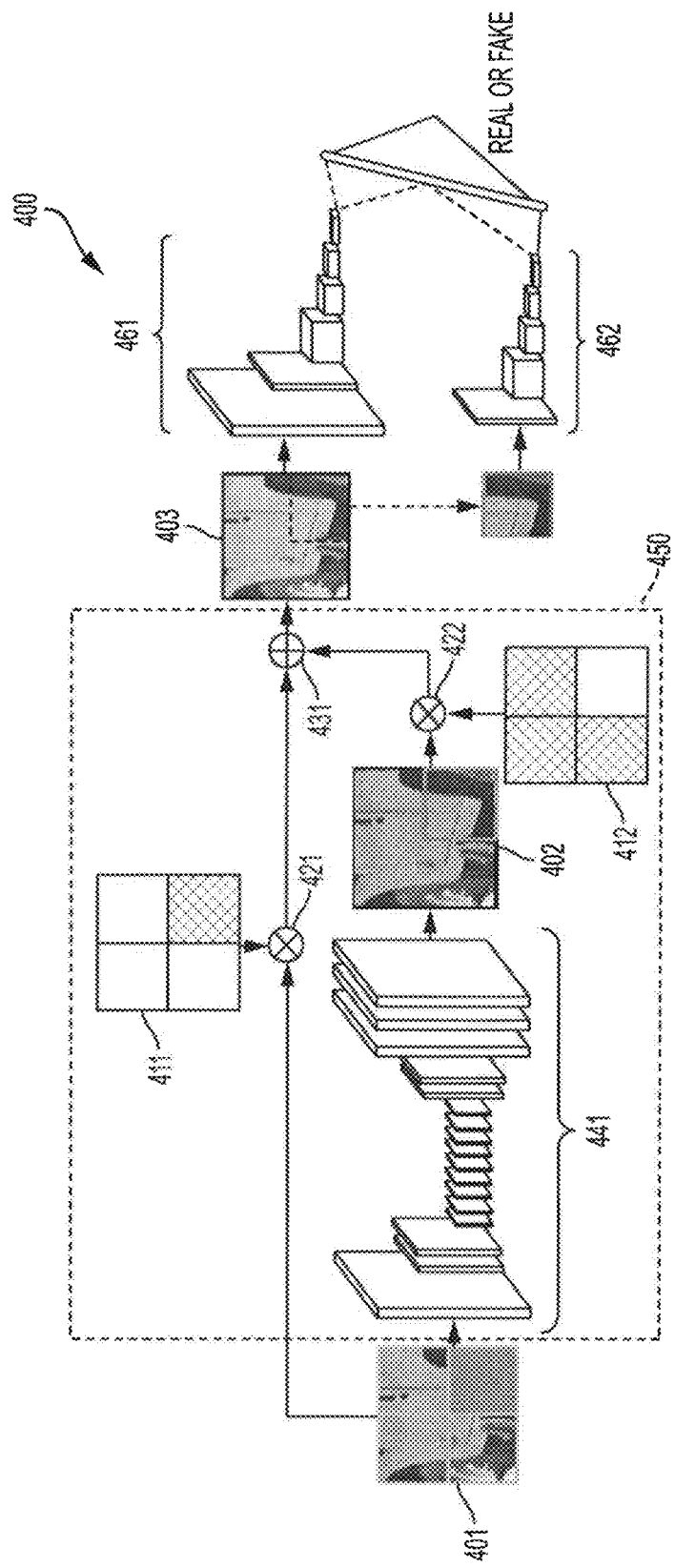
FIG. 4 shows an exemplary GAN based intra prediction architecture as may be implemented using inpainting intra prediction according to embodiments of the present invention.

FIG. 4 shows exemplary GAN based inpainting architecture, some or all of which may be implemented for GAN based intra prediction for video coding according to embodiments of the invention, GAN based inpainting architecture 400 shown in FIG. 4 comprises multipliers 421 and 422, such as for applying mask data to image data to generate an original image portion and corresponding predicted image portion, and summer 431, such as for combining the original image portion and predicted image portion and forming a completed image. GAN based inpainting architecture 400 of the illustrated embodiment is further shown as comprising two networks, including a generator network or G network (shown as generator 441), such as for generating a predicted image, and a discriminator network or D network (shown as global discriminator 461 and local discriminator 462), such as for analyzing the predicted image, see also, S. Iizuka, E. S.-Serra and H. Ishikawa, "Globally and locally consistent image completion", ACM Trans, On Graph., vol. 36, no. 4, pp. 107:1-107:14, July 2017, the disclosure of which is incorporated herein by reference. It should be appreciated that the discriminator network of GAN based inpainting architecture 400 is utilized for training, and thus may not be included in the inference stage of a GAN based inpainting intra prediction implementation of embodiments of the invention. Accordingly, multipliers 421 and 422, summer 431, and generator 441 comprise GAN based intra prediction engine 450 operable using GAN based inpainting model configured for use in the task of intra prediction for video coding, as will be better understood from the description below.

Some or all of the foregoing GAN based inpainting architecture may be implemented as logic configured for performing operation consistent with that described herein. Such logic may be implemented in one or more special purpose processors (e.g., Application Specific Integrated Circuit (ASIC), Field Programmable Gate Array (FPGA), Graphics Processing Unit (GPU), etc.) and/or one or more general purpose processors (e.g., processors from the Intel CORE line of processors) executing code (e.g., instruction sets) for performing the requisite functions. When implemented in software, elements of the GAN based inpainting architecture and/or other aspects of embodiments of the present invention may comprise the code segments to perform the necessary tasks, wherein the program or code segments can be stored in a processor readable medium. The "processor readable medium" may include any medium that can store or transfer information. Examples of a processor readable medium include an electronic circuit, a semiconductor memory device, a Read Only Memory (ROM), a flash memory, an Erasable ROM (EROM), a Compact Disk (CD) ROM, an optical disk, a hard disk, a fiber optic medium, etc.

Figure 5:
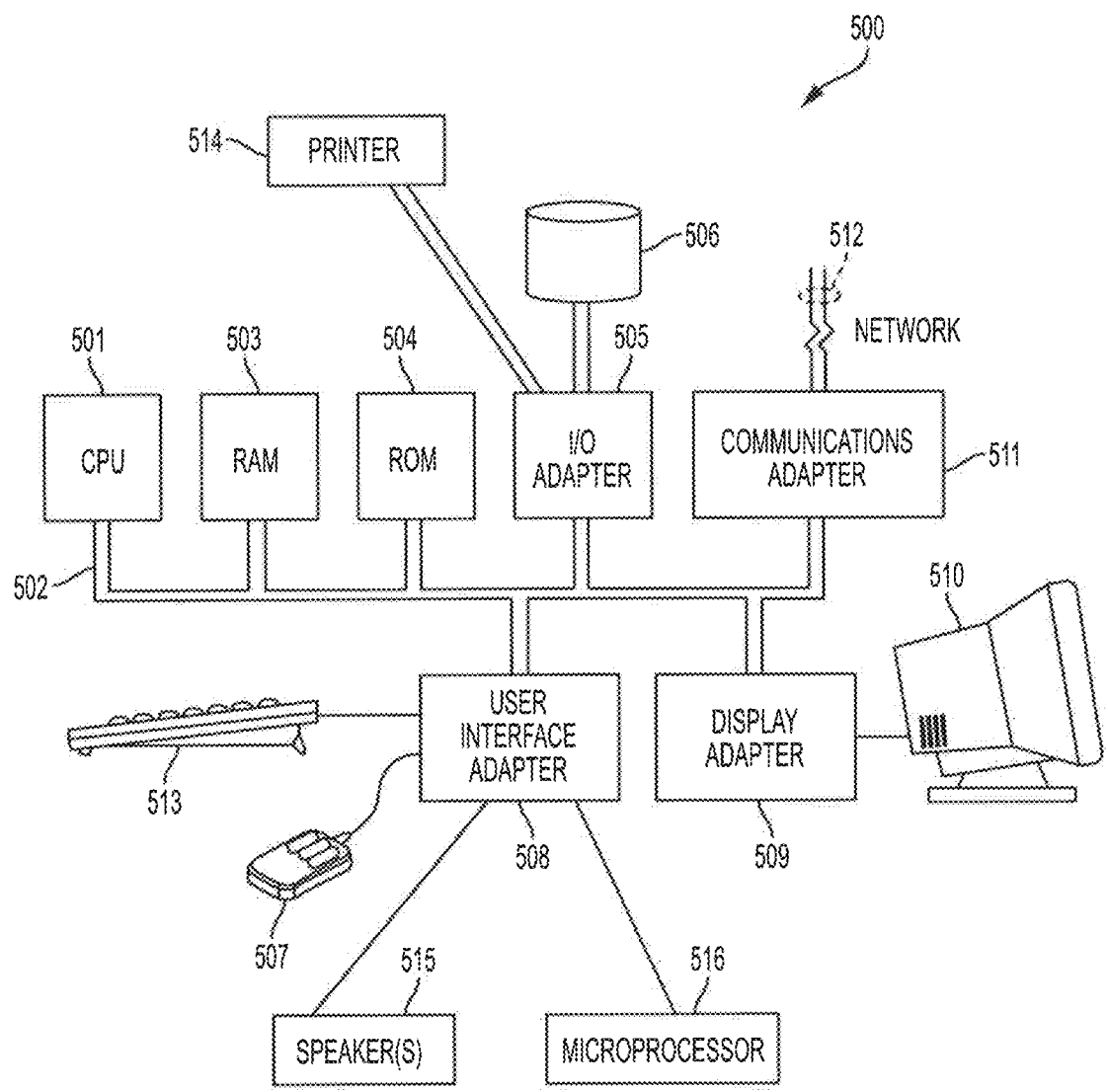
FIG. 5 shows a computer system as may be utilized in implementing a GAN based inpainting intra prediction architecture, or portions thereof, of embodiments of the present invention.

FIG. 5 illustrates computer system 500 as may be utilized in implementing embodiments of the present invention and/or portions thereof, such as GAN based inpainting architecture 400 of FIG. 4. Central Processing Unit (CPU) 501 is coupled to system bus 502, CPU 501 may be any general purpose CPU, such as an Intel CORE processor. However, the present invention is not restricted by the architecture of CPU 501 as long as CPU 501 supports the inventive operations as described herein. Bus 502 is coupled to Random Access Memory (RAM) 503, such as may comprise SRAM, DRAM, SDRAM, etc. ROM 504 is also coupled to bus 502, which may comprise PROM, EPROM, or EEPROM. RAM 503 and ROM 504 may operate to store user and system data and programs (e.g., the aforementioned instruction sets) as is well known in the art.

Bus 502 is also coupled to Input/Output (I/O) controller 505, communications adapter 511, user interface adaptor 508, and display adaptor 509. I/O adapter 505 connects storage devices 506, such as may comprise one or more of a hard drive, a CD drive, an optical drive, etc., to the computer system. I/O adapter 505 is also connected to printer 514, which would allow the system to print paper copies of information such as document, photographs, articles, etc. Note that the printer may be a printer (e.g. dot matrix, laser, etc.), a fax machine, a copier machine, etc. Communications adaptor 511 is adapted to couple computer system 500 to network 512, which may be one or more of a telephone network, a local area network (LAN), a wide-area network (WAN) network, a cellular network, the Internet, and/or one or more other networks, User interface adaptor 508 couples user input devices, such as keyboard 513, pointing device 507, and microphone 516, to the computer system 500. User interface adaptor 508 also provides sound output to a user via speaker(s) 515. Display adaptor 509 is driven by CPU 501 to control the display on display device 510.

Referring again to the exemplary GAN based inpainting architecture of FIG. 4, the model used for intra prediction treats the above-left (block 310), above (block 320), and left (block 330) reconstructed blocks as the inputs, and infers the missing block at the bottom-right corner (block 340). The corresponding mask (mask 411 for input blocks 310, 320, and 330, and mask 412 for inferred block 340) is applied to indicate the missing pixels and the predicted pixels, wherein multipliers 421 and 422 provide pixelwise multiplication. In accordance with embodiments of the invention, masks 411 and 412 are binary. For example, in mask 411 the values in the blocks of above-left (block 310), above (block 320), and left (block 330) may be 1, while the values in the block of bottom-right (block 340) are 0, and correspondingly the values in the blocks of mask 412 may be inverse to those in mask 411. The portion of the input image having pixels of the prediction block (e.g., the missing pixels) omitted (e.g., blocks 310, 320, and 330) isolated through use of mask 411 and multiplier 421 and the prediction block isolated through use of mask 412 and multiplier 422 are combined to provide output image 403 using summer 431 of the illustrated embodiment.

Generator 441, providing the generator network of the illustrated embodiment of GAN based inpainting architecture 400, comprises a plurality of convolutional layers (e.g., 17 as shown in the illustrated embodiment) which are used for predicting the missing part of an image. Discriminators 461 and 462, providing the discriminator network of the illustrated embodiment of GAN based inpainting architecture 400, can be regarded as a binary classifier to identify whether the predicted missing part is real or fake. The two parts in the discriminator network (i.e., global discriminator 461 and local discriminator 462) are provided according to embodiments to boost the performance. Local discriminator 462 comprises a plurality of convolutional layers (e.g., 4 as shown in the illustrated embodiment) and one fully-connected layer, wherein the input is the predicted missing part.

Global discriminator 461 also comprises a plurality of convolutional layers (e.g., 5) and one fully-connected layer, however the input is the whole image, where the missing part is the predicted and the other blocks are from the original input. It should be appreciated that more or fewer convolutional layers than those shown in the illustrated examples of the generator and/or discriminators may be implemented according to embodiments of the invention, wherein more convolutional layers will increase the computational complexity of the GAN based inpainting system implementation, while fewer convolutional layers will degrade the performance gain provided by the GAN based inpainting system implementation.

In applying GAN based inpainting in intra prediction for video coding according to embodiments, GAN based intra prediction is implemented into a direction based intra prediction intra coding (e.g., HEVC intra coding) framework. It should be appreciated that, the visual signals present different statistical characteristics, because of which different directional modes have been employed in HEW intra prediction. Analogously, it is also expected that the GAN model can handle different signal characteristics by designing multiple prediction modes. Accordingly, a plurality of intra prediction modes (e.g., a total of 35 intra prediction modes, following HEVC) are designed for CAN based intra prediction according to embodiments of the invention. In implementing GAN based intra prediction and direction based intra coding framework according to embodiments of the invention, the GAN based intra prediction can compete with the direction based intra prediction in the sense of RDO.

Figure 6A:
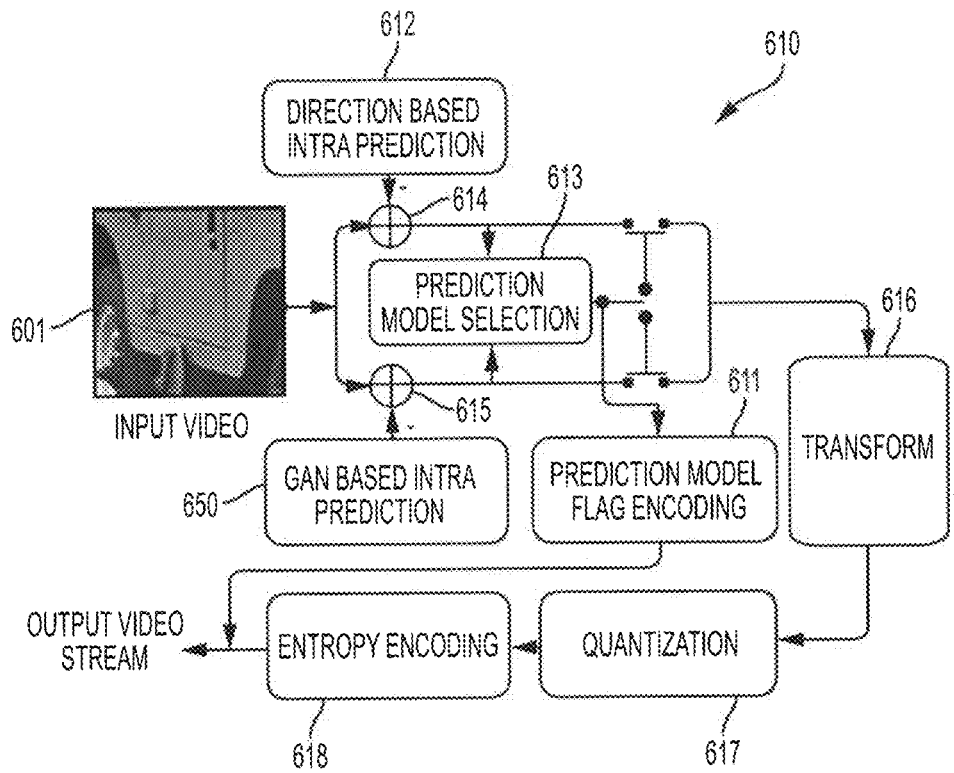
FIG. 6A shows a GAN based inpainting intra prediction encoder of embodiments of the present invention.
Figure 6B:
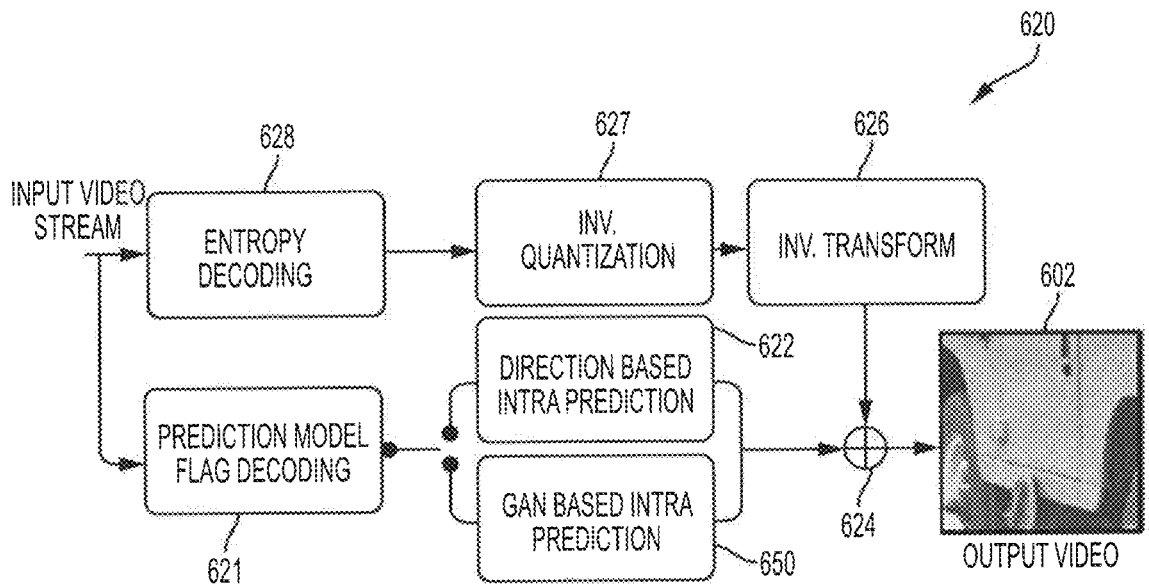
FIG. 6B shows a GAN based inpainting intra prediction decoder of embodiments of the present invention.

Exemplary embodiments of a video codec with GAN based intra prediction applying GAN based inpainting in intra prediction for video coding is illustrated in FIGS. 6A and 6B. In particular, FIG. 6A shows an embodiment of GAN based intra prediction encoder 610 in which GAN based intra prediction is implemented into a direction based intra coding framework (e.g., GAN based intra prediction, prediction model selection, and prediction model flag encoding as described above may be added to a video encoder, such as a HEVC video encoder). Correspondingly, FIG. 6B shows an embodiment of CAN based intra prediction decoder 620 in which GAN based intra prediction, using GAN based intra prediction engine 650, is implemented into a direction based intra coding framework (e.g., prediction model flag decoding and GAN based intra prediction as described above may be added to a video decoder, such as a HEVC video decoder). The GAN based intra prediction encoder and decoder of the embodiments illustrated in FIGS. 6A and 6B implement GAN based intra prediction using GAN based intra prediction engine 650, such as may correspond to an embodiment of GAN based intra prediction engine 450 of FIG. 4. As described above, GAN based inpainting architecture of GAN based intra prediction engine 650 may be implemented as logic (e.g., one or more instruction sets executed by special purpose processors and/or general purpose processors) configured for performing operation consistent with that described herein. Likewise, other components of GAN based intra prediction encoder 610 (e.g., prediction model flag encoding logic 611, direction based intra prediction engine 612, prediction model selection logic 613, summer 614, summer 615, transform circuit 616, quantization circuit 617, and/or entropy encoding circuit 618) and/or GAN based intra prediction decoder 620 (e.g., prediction model flag decoding 621, direction based intra prediction engine 622, summer 624, inverse transform circuit 626, inverse quantization circuit 627, and/or entropy decoding circuit 628) may be implemented as logic configured for performing operation consistent with that described herein.

The illustrated embodiments the GAN based intra prediction encoder and decoder of FIGS. 6A and 6B, wherein the CAN based intra prediction is implemented into a direction based intra coding framework, is configured for indicating the prediction strategy utilized with respect to any particular image between the encoder and decoder. For example, a flag to signal the prediction strategy may be generated by prediction model flag encoding logic 611 of GAN based intra prediction encoder 610 to signal a selected prediction strategy (e.g., GAN based intra prediction or direction based intra prediction) to GAN based intra prediction decoder 620. Correspondingly, the flag signaling the prediction strategy may be extracted by prediction model flag decoding logic 621 of GAN based intra prediction decoder 620 to identify a selected prediction strategy (e.g., GAN based intra prediction or direction based intra prediction) used in encoding a particular image. In operation according to embodiments, if the GAN based intra prediction is selected, the prediction model flag is set as 1, otherwise the prediction model flag is set as 0, wherein the prediction model flag is transmitted to the decoder with encoded video data.

In exemplary operation of GAN based intra prediction encoder 610, direction based intra prediction is performed with respect to an input image (e.g., image 601) by direction based intra prediction engine 612 (e.g., providing prediction in accordance with HEVC intra prediction) and GAN based intra prediction is performed with respect to the input image by GAN based intra prediction engine 650 simultaneously. Direction based intra prediction engine operates to generate plurality (e.g., the 35 intra prediction modes of HEVC) of predicted blocks for the input image (e.g., partitioning the input into multiple units and predicting each unit using direction based intra prediction). Similarly, CAN based intra prediction engine 650 operates to generate a plurality (e.g., 35 intra prediction modes for the CAN model using a latent variable to control different generation modes) of predicted blocks for the input image (e.g., partitioning the input into multiple units and predicting each unit using CAN based intra prediction). In using the aforementioned latent variable by a GAN based intra prediction engine of embodiments, the pixels in the block to be predicted are initially assigned the same values for one version, and for 35 different versions the difference lies in that the assigned values change from 0 to $2^k - 1$, where k is the bit depth. Summers 614 and 615 are operable to subtract the prediction provided by a corresponding one of direction based intra prediction engine 612 (summer 614) and GAN based intra prediction engine (summer 615) from the input image unit.

For the direction based intra prediction, the results of the plurality of intra prediction modes provided by direction based intra prediction engine 612 (e.g., as output by summer 614) are examined and their RD costs calculated by prediction model selection logic 613. Likewise, for the GAN based intra prediction, the results of the plurality of intra prediction modes provided by GAN based intra prediction engine 650 (e.g., as output by summer 615) are examined and their RD costs calculated by prediction model selection logic 613. In the example where 35 versions of the predicted blocks are generated by direction based intra prediction engine 612 and 35 versions of the predicted blocks are generated by GAN based intra prediction engine 650, there are 70 intra prediction modes, and prediction model selection logic 613 of embodiments selects the best one (e.g., the intra prediction mode with the minimum RD cost).

In accordance with embodiments of the invention, the GAN based intra prediction is only used for the PUs with size of 64×64, and for the PU size less than 64×64 the prediction is directly copied from the current PU with size of 64×64 at the same location. Moreover, as there is no reference information for the above (block 320) and left (block 330) blocks in a frame, they may be predicted according to embodiments by the traditional extrapolation based intra prediction strategy.

After having selected the intra prediction mode used with respect to the particular input image, prediction model section logic 613 of embodiments controls output of the results of the selected prediction mode to coding circuitry of GAN based intra prediction encoder 610. Accordingly, transform circuit 616 and quantization circuit 617 may operate to provide transforming and quantizing the residual (the difference between the original image unit and the prediction unit), and entropy encoding circuit 618 may provide entropy encoding transform output, as is known in the art.

Since each intra coding mode corresponds to either an output from the directional intra coding model or an output from the CAN intra coding model, one additional flag may be used to represent the final prediction strategy. Accordingly, prediction model flag encoding logic 611 operates to control a prediction model flag for signaling the selected prediction strategy (e.g., GAN based intra prediction or direction based intra prediction) to a corresponding decoder. The encoding of indices for the specific intra prediction mode (0-34) according to embodiments may be maintained the same as that in HEVC (i.e., the prediction model flag indicating whether the indices corresponds to a direction based intra prediction mode or a GAN based intra prediction mode).

It should be appreciated that the output video stream provided by GAN based intra prediction encoder 610 of embodiments of the invention provides data in addition to the encoded video. For example, the output video stream of the illustrated embodiment includes information regarding the intra prediction method selected (e.g., prediction model flag) in addition to prediction information, mode information, and headers.

In exemplary operation of GAN based intra prediction decoder 620, information regarding the intra prediction method selected is decoded for determining the intra prediction used with respect to one or more images in the input video stream. For example, prediction model flag decoding logic 621 of the illustrated embodiment may operate to decode the aforementioned prediction model flag indicating the prediction strategy for each PU. In operation according to embodiments of GAN based intra prediction decoder 620, depending upon the information regarding the selected intra prediction method extracted by prediction model flag decoding 621 either the GAN model or the direction model is applied to generate the predicted version of the PU. For example, when the prediction model flag indicates that the GAN based intra prediction is used (e.g., the prediction model flag is 1), the SAN model may be applied by GAN based intra prediction engine 650 for predicting the PUs, whereas when the prediction model flag indicates that direction based intra prediction is used (e.g., the prediction model flag is 0), the direction model may be applied by direction based intra prediction engine 622 for predicting the PUs.

Entropy decoding circuit 628 may provide entropy decoding transform output with respect to the input video stream, and inverse quantization circuit 627 and inverse transform circuit 626 and may operate to provide resealing and inverting the transform stage, as is known in the art. The predicted blocks generated by the selected one of direction based intra prediction engine 612 and GAN based intra prediction engine 650 are added to the output of inverse transform circuit 626 for reconstructing a decoded video image (e.g., output image 602).

Having described the operation of embodiments of GAN based intra prediction encoders and decoders, GAN model training for providing an advanced GAN based inpainting model configured for use in the task of intra prediction according to embodiments of the invention will be provided. To aid in understanding concepts of the present invention, a methodology to generate 35 different versions of output through GAN based intra prediction is provided. It should be appreciated, however, that the concepts herein apply to different numbers of output versions, and thus are not limited to the 35 different versions of output referenced in the example.

In GAN model training according to the exemplary embodiment, the training data are collected from 800 images with the resolution of 512×384 in an uncompressed color image database, see G. Schaefer and M. Stich, "UCID: an uncompressed color image database", in Proceedings of SPIE: Storage and Retrieval Methods and Applications for Multimedia, vol. 5307, 2004, the disclosure of which is incorporated herein by reference. The images are encoded by the HEVC test model under QP of 22. One sample is shown in FIG. 3 with the size of 128×128, in which the missing part, with size of 64×64, is located at the bottom-right (block 340) of the sample image. This sample with its corresponding ground truth without any coding distortion forms a training pair. In accordance with embodiments of the invention, only the luma component is extracted for training. There are 28000 samples collected in total according to embodiments.

A straightforward approach may be to train 35 GAN models to generate the 35 versions of prediction from GAN. However, this strategy significantly increases the burden for storing the neural network model for both encoder and decoder. Accordingly, a latent variable that controls different generation modes is defined according to embodiments of the invention. For example, a latent variable may be defined such that the pixels in the block to be predicted are initially assigned the same values for one version, and for 35 different versions the difference lies in that the assigned values change from 0 to $2^k-1$, where k is the bit depth. As a specific example, if the index of version is X, $X \in [0,34]$, the assigned value is $(X/34) \times (2^k-1)$. In the training stage, 35 different versions of input may be generated, wherein their differences lie in the initial pixel values of the missing part to be predicted. The initial pixel values of the missing part may randomly be set for each sample at one epoch during the training stage in accordance with the following:

$$P = \left\lfloor \frac{X}{34} \times (2^k - 1) \right\rfloor, \quad (1)$$

where $\lfloor \_ \rfloor$ is the function of floor round operation, X is randomly selected from $\{0, 1, 2, \ldots, 34\}$, and k represents the bit depth. FIG. 7 shows an example of 35 versions of input to GAN. In the illustrated example, the parameter k (bit depth) is 8.

To provide GAN based intra prediction, the target is to minimize the difference between prediction and original blocks. Accordingly, in accordance with embodiments of the present invention, the generator may be trained for the first few epochs by the loss function of Mean Squared Error (MSE).

$$L = \|A_1 - A_2\|^2, \quad (2)$$

where $A_1$ and $A_2$ are the local information, which indicate the bottom-right block (64×64) of $R_m$ and $G(I_m)$, respectively. $G(I_m)$ and Rm are the output of generator and the ground truth for the $m^{th}$ sample 6, respectively.

After a few epochs, the whole GAN network can be trained. For each training iteration, the generator and the discriminator (e.g., generator 441, global discriminator 461, and local discriminator 462) of embodiments will be repeatedly updated one by one. This is a min-max optimization problem. For D network updating, it is a maximization problem with the G network fixed. For G network updating, it is a minimum problem with the D network fixed. A joint loss function may be applied.

$$\min_G \max_D E[\alpha L + \log D(A_1, B_1) + \log(1 - D(A_2, B_2))], \quad (3)$$

where $B_1$ and $B_2$ are the global information, which indicate the ground truth $R_m$ and output of generator $G(I_m)$, respectively. The parameter a is a weighting value to balance MSE loss and binary cross-entropy loss.

The TENSORFLOW open source machine learning framework available from Google, Inc. may be utilized for GAN training in accordance with the foregoing. For example, a training stage algorithm, as shown in FIG. 8, may be executed using a TESLA K80 GPU, available from Nvidia Corporation, with 5000 epochs, wherein the batch size and the learning rate are set as 35 and 1×10$^{-4}$, respectively.

As can be appreciated from the foregoing, embodiments of the present invention provide GAN based intra prediction configured to address limitations, such as limited reference information and fixed prediction patterns, of the intra prediction methods implemented by current and next generation video coding techniques. Intra prediction is implemented by GAN based intra prediction encoders of embodiments as an inpainting task, wherein intra prediction is formulated as learning based inpainting to fill in the missing part of an image (e.g., frame of a digital video) by conditioning on the available reconstructed pixels. Embodiments may apply GAN based inpainting in intra prediction for video coding in commercial products with relatively minor revisions when applied to a video codec. Such GAN based intra prediction for video coding according to embodiments may be utilized to significantly improve the coding performance, which can be used in video transmission and storage with limited resources.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for video coding, the method comprising:
providing a Generative Adversarial Network (GAN) based intra prediction engine having a plurality of intra prediction modes configured for GAN based intra prediction using a latent variable, wherein the GAN based intra prediction engine comprises a generator network configured to generate a predicted image and a discriminator network configured to evaluate an intra prediction mode of the plurality of intra prediction modes, wherein the GAN based intra prediction engine is configured to apply the latent variable to generate the plurality of intra prediction modes, and wherein the intra prediction mode of the plurality of intra prediction modes corresponds to a particular pixel value assigned to pixels of a missing part of an input image; and
generating, by the GAN based intra prediction engine, a plurality of GAN based prediction blocks for the input image to be coded using the plurality of intra prediction modes configured for GAN based intra prediction.

2. The method of claim 1, wherein the intra prediction mode is different from and in addition to intra prediction modes produced by a direction based intra prediction engine implemented in parallel with the GAN based intra prediction engine.

3. The method of claim 1, further comprising:
training the GAN based intra prediction engine using the latent variable to control different generation modes of the plurality of intra prediction modes.

4. The method of claim 3, wherein different versions of the input image are generated for training the GAN based intra prediction engine using the latent variable, wherein differences of the different versions of the input image lie in initial pixel values of a missing part to be predicted.

5. The method of claim 1, wherein the GAN based intra prediction comprises inpainting intra prediction.

6. The method of claim 1, wherein the plurality of intra prediction modes configured for GAN based intra prediction comprise inpainting intra prediction modes configured using the latent variable.

7. The method of claim 6, wherein the GAN based intra prediction engine comprises a generation network having a plurality of convolutional layers used for predicting parts of the input image.

8. The method of claim 1, wherein training the GAN based intra prediction engine further comprises:
using a discriminator network having a global discriminator and a local discriminator, wherein the global discriminator and the local discriminator each have a plurality of convolutional layers, and wherein the local discriminator is configured to receive the missing part of the input image as a first input, and wherein the global discriminator is configured to receive the input image as a second input.

9. The method of claim 1, wherein generating the plurality of GAN based predicted blocks for the input image comprises:
partitioning the input image into multiple blocks; and
predicting blocks using GAN based intra prediction.

10. The method of claim 1, wherein the generating a plurality of prediction blocks comprises:
for a particular prediction block, treating three blocks adjacent to the particular prediction block in the input image as GAN based intra prediction inputs; and
inferring the particular prediction block from the three adjacent blocks.

11. The method of claim 10, wherein the three adjacent blocks are above-left, above, and left of the particular prediction block in the input image.

12. The method of claim 10, wherein the generating a plurality of prediction blocks further comprises:
implementing pixelwise multiplication of a first mask and the input image, wherein the pixelwise multiplication provides pixels of a portion of the input image having pixels of the particular prediction block omitted; and
implementing pixelwise multiplication of a second mask and the particular prediction block resulting from the inferring the particular prediction block from the three adjacent blocks, wherein the pixelwise multiplication provides isolated pixels of the particular prediction block.

13. The method of claim 12, wherein the generating a plurality of prediction blocks further comprises:
summing the pixels of the portion of the input image having pixels of the particular prediction block omitted and the isolated pixels of the particular prediction block omitted to provide an output image from the GAN based intra prediction engine.

14. The method of claim 1, further comprising:
providing a direction based intra prediction engine having a plurality of intra prediction modes configured for direction based intra prediction;
generating, by the direction based intra prediction engine, a plurality of prediction blocks for the input image to be coded using the plurality of intra prediction modes configured for direction based intra prediction; and
selecting an intra prediction mode for video coding with respect to the input image based on an intra prediction mode of the GAN based intra prediction and the direction based intra prediction having a minimum Rate Distortion (RD) cost.

15. A method for video coding, the method comprising:
generating a plurality of inpainting intra prediction blocks for an input image to be coded by inpainting based intra prediction using a plurality of inpainting intra prediction modes, wherein generating the plurality of inpainting intra prediction blocks comprises generating a plurality of intra prediction modes by changing initially assigned pixel values in each prediction block of the plurality of inpainting intra prediction blocks;
generating a plurality of direction based prediction blocks for the input image to be coded by direction based intra prediction using a plurality of direction intra prediction modes; and
selecting an intra prediction mode for video coding with respect to the input image based on the intra prediction mode of the inpainting based intra prediction and the direction based intra prediction having a minimum Rate Distortion (RD) cost.

16. The method of claim 15, wherein the plurality of inpainting intra prediction modes are configured for intra prediction using a latent variable.

17. The method of claim 16, wherein generating the plurality of inpainting intra prediction blocks for the input image using the plurality of inpainting intra prediction modes using the latent variable comprises:
initially assigning pixel values in each block to be predicted of the plurality of inpainting intra prediction blocks the same values; and
changing the initially assigned pixel values from 0 to $2^k$ 1 for each inpainting intra prediction mode of the plurality of inpainting intra prediction modes, where k is bit depth.

18. The method of claim 15, wherein the inpainting based intra prediction is performed by a Generative Adversarial Network (GAN) based inpainting intra prediction engine.

19. The method of claim 18, further comprising:
training the GAN based inpainting intra prediction engine using a latent variable to control different generation modes of the plurality of inpainting intra prediction modes.

20. The method of claim 19, wherein different versions of the input image are generated for the training using the latent variable, wherein differences of the different versions of the input image lie in initial pixel values of a missing part to be predicted.

21. The method of claim 18, wherein the GAN based inpainting intra prediction engine comprises a generation network having a plurality of convolutional layers used for predicting parts of the input image.

22. The method of claim 21, wherein training the GAN based inpainting intra prediction engine further comprises:
using a discriminator network having a global discriminator and a local discriminator, wherein the global discriminator and the local discriminator each have a plurality of convolutional layers.

23. A system for video coding, the system comprising:
a Generative Adversarial Network (GAN) based inpainting intra prediction engine configured to generate a plurality of prediction blocks for an input image to be coded by inpainting based intra prediction using a plurality of inpainting intra prediction modes;
a direction based intra prediction engine configured to generate a plurality of prediction blocks for the input image to be coded by direction based intra prediction using a plurality of direction intra prediction modes; and
prediction model selection logic configured to select an intra prediction mode for video coding with respect to the input image based on a comparison between an intra prediction Rate Distortion (RD) cost value of the intra prediction mode of the inpainting based intra prediction and a direction based RD cost value of the direction based intra prediction.

24. The system of claim 23, wherein the prediction model selection logic selects the intra prediction mode for video coding from the inpainting based intra prediction and the direction based intra prediction having a minimum Rate Distortion (RD) cost.

25. The system of claim 23, further comprising:
prediction model flag encoding logic configured to signal a selected prediction mode of the inpainting based intra prediction and the direction based intra prediction to a corresponding decoder.

* * * * *

UNITED STATES PATENT AND TRADEMARK OFFICE
CERTIFICATE OF CORRECTION

PATENT NO.        : 11,159,789 B2
APPLICATION NO.   : 16/169729
DATED             : October 26, 2021
INVENTOR(S)       : Tak Wu Sam Kwong et al.

It is certified that error appears in the above-identified patent and that said Letters Patent is hereby corrected as shown below:

In the Specification

At Column 1, Line number 38, delete "Resealing" and replace with --Rescaling--.
At Column 1, Line number 60, delete "frame spatial-domain" and replace with --frame (i.e., spatial-domain--.
At Column 1, Line number 66, delete "prediction intra-image" and replace with --prediction (e.g., intra-image--.
At Column 2, Line number 65, delete "(ICU)" and replace with --(PU)--.
At Column 3, Line number 6, delete "(V, $C_b$ and $C_t$)" and replace with --(Y, $C_b$ and $C_r$)--.
At Column 3, Line number 46, delete "NET" and replace with --JVET--.
At Column 4, Line number 31, delete "lura" and replace with --luma--.
At Column 7, Line number 13, delete "invention, GAN" and replace with --invention. GAN--.
At Column 7, Line number 25, delete "1izuka" and replace with --Iizuka--.
At Column 7, Line number 66, delete "502, CPU 501" and replace with --502. CPU 501--.
At Column 8, Line number 24, delete "networks, User" and replace with --networks. User--.
At Column 9, Line number 21, delete "HEW" and replace with --HEVC--.
At Column 9, Line number 26, delete "CAN based" and replace with --GAN based--.
At Column 9, Line number 42, delete "CAN based" and replace with --GAN based--.
At Column 10, Line number 6, delete "CAN based" and replace with --GAN based--.
At Column 10, Line number 36, delete "CAN based" and replace with --GAN based--.
At Column 10, Line number 38, delete "CAN model" and replace with --GAN model--.
At Column 10, Line number 41, delete "CAN based" and replace with --GAN based--.
At Column 11, Line number 23, delete "CAN intra coding model" and replace with --GAN intra coding model--.
At Column 11, Line number 58, delete "SAN model" and replace with --GAN model--.
At Column 11, Line number 67, delete "resealing" and replace with --rescaling--.
At Column 13, Line number 9, delete "sample 6" and replace with --sample $I_m$--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,159,789 B2

In the Claims

At Column 16, Claim number 17, starting at Line number 11, delete "$2^k\ 1$" and replace with --$2^k$-1--.